(12) United States Patent
Hattori et al.

(10) Patent No.: US 7,578,853 B2
(45) Date of Patent: Aug. 25, 2009

(54) SCANNING PROBE MICROSCOPE SYSTEM

(75) Inventors: Tatsuya Hattori, Saitama-ken (JP); Pu Qian, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 11/631,439

(22) PCT Filed: Jul. 1, 2005

(86) PCT No.: PCT/JP2005/012249

§ 371 (c)(1),
(2), (4) Date: Jan. 3, 2007

(87) PCT Pub. No.: WO2006/004064

PCT Pub. Date: Jan. 12, 2006

(65) Prior Publication Data

US 2008/0017809 A1    Jan. 24, 2008

(30) Foreign Application Priority Data

Jul. 2, 2004    (JP)   ............... 2004-197287

(51) Int. Cl.
*G01N 13/10*   (2006.01)
(52) U.S. Cl. .............. 850/52; 850/53; 850/56; 850/57; 250/306; 250/307; 250/442.11; 73/105; 324/724; 977/849; 977/851; 977/860; 977/872; 977/873
(58) Field of Classification Search ............ 250/306, 250/307, 309, 442.11; 73/105; 324/724; 977/860, 872, 873, 851, 852, 849; 216/2; 850/52, 53, 56, 57, 60
See application file for complete search history.

(56) References Cited

U.S. PATENT DOCUMENTS

| | | | |
|---|---|---|---|
| 4,282,481 A * | 8/1981 | Dunn ..................... 324/701 |
| 5,132,533 A | 7/1992 | Kawase et al. |
| 5,166,520 A | 11/1992 | Prater et al. |
| 5,440,122 A * | 8/1995 | Yasutake ............. 250/443.1 |
| 5,630,932 A * | 5/1997 | Lindsay et al. ............ 205/645 |
| 2005/0016952 A1* | 1/2005 | Hamann et al. ............ 216/57 |
| 2005/0074363 A1* | 4/2005 | Dunfee .................... 422/81 |
| 2007/0008390 A1* | 1/2007 | Cruchon-Dupeyrat et al. . 347/85 |
| 2008/0131325 A1* | 6/2008 | Espinosa et al. ........... 422/100 |

FOREIGN PATENT DOCUMENTS

| | | |
|---|---|---|
| EP | 0431623 | 6/1991 |
| JP | 02-163388 | 6/1990 |
| JP | 04-337402 | 11/1992 |

(Continued)

*Primary Examiner*—David A Vanore
*Assistant Examiner*—Michael J Logie
(74) *Attorney, Agent, or Firm*—Lahive & Cockfield, LLP; Anthony A. Laurentano

(57) ABSTRACT

A scanning probe microscope system comprising a hollow probe 3, a tube 4 connected to a rear end 32 of the hollow probe 3, a support table 1 provided under the hollow probe 3, and a substrate 2 and a means 5 for washing the hollow probe 3 that are fixed to the support table 1, a sample S passing through the tube 4 and the hollow probe 3, and the substrate 2 and the washing means 5 being moved by the support table 1 such that each of them opposes the hollow probe 3.

6 Claims, 9 Drawing Sheets

FOREIGN PATENT DOCUMENTS

| | | | |
|---|---|---|---|
| JP | 04337402 A | * | 11/1992 |
| JP | 05-27666 | | 4/1993 |
| JP | 06-223766 | | 8/1994 |
| JP | 07-049352 | | 2/1995 |
| JP | 09-251979 | | 9/1997 |
| JP | 2001-014716 | | 9/2001 |
| JP | 2001-255256 | | 9/2001 |
| JP | 2002307247 A | * | 10/2002 |
| JP | 2003-254886 | | 9/2003 |

* cited by examiner 2.00 nm

SCANNING PROBE MICROSCOPE SYSTEM

RELATED APPLICATIONS

This application is a 35 U.S.C. 371 national stage filing of International Application No. PCT/JP2005/012249, filed 1 Jul. 2005, which claims priority to Japanese Patent Application No. 2004-197287 filed on 2 Jul. 2004 in Japan. The contents of the aforementioned applications are hereby incorporated by reference.

FIELD OF THE INVENTION

The present invention relates to a system using a scanning probe microscope (SPM) such as a scanning tunneling microscope (STM), an atomic force microscope (AFM), etc., particularly to a scanning probe microscope system capable of automatically treating pluralities of samples.

BACKGROUND OF THE INVENTION

The scanning tunneling microscope (STM) is an apparatus utilizing tunneling current generated by applying a bias voltage between a probe and a sample. The level of tunneling current is in reverse proportion to the distance between the probe and the sample. Accordingly, for instance, when the sample is scanned while adjusting their distance to provide a constant tunneling current, the fine surface shape of the sample can be determined from the displacement of the probe. Because the scanning tunneling microscope can observe atom arrangements and surface structures on the atom scale, it is used for the evaluation of semiconductor devices, the observation of biomolecules, etc. However, because observation using the scanning tunneling microscope needs extremely complicated operations such as the setting of a microscope at a measurable condition, the exchange of a deteriorated probe, etc., the scanning tunneling microscope is not suitable for treating large numbers of samples. It is thus used only for research, but not yet in industry.

JP2003-254886 A1 discloses a gas chromatograph scanning probe microscope comprising a scanning probe microscope comprising a means for evaporating and decomposing a sample by heating a portion of the sample to be observed at a tip end of a probe fixed to one end of a cantilever, and a gas pipe passing from a tip-end opening of the probe to the opening of the cantilever at the other end through the probe and the cantilever; and a gas chromatograph mass analyzer receiving a gas from the other-end opening of the cantilever through the gas pipe. Using this gas chromatograph scanning probe microscope, the sample can be evaporated to generate a gas, which is collected to analyze the composition of the sample. However, because the probe is contaminated after the analysis, the probe should be detached and washed. Accordingly, it is impossible to automatically conduct the analysis of pluralities of samples.

U.S. Pat. No. 5,166,520 B1 discloses a probe for a probe microscope, which has a tapered hollow shape for use in the scanning of sample surfaces in various technical fields. The hollow probe is mounted, for instance, to a free end of a cantilever. A cavity of the hollow probe is filled with a metal, a semiconductor, an electrolytic solution, etc. selected by taking interaction with a sample surface into consideration, and the filled material is connected to a conductor wire longitudinally extending in the cantilever. The hollow probe has an opening with a predetermined diameter at a tip end, so that the material charged into the hollow probe leaks. However, because only a material charged into the cavity of the hollow probe in advance can be leaked, it cannot be used while continuously supplying the desired sample.

Using the scanning tunneling microscope, the position of a probe can be controlled on the atom scale to depict a fine pattern. JP7-49352 A1 discloses a scanning tunneling microscope comprising a hollow probe for detecting tunneling current, a different material from the probe and filled in the probe, and a heater disposed near the probe. To depict a fine pattern by the scanning tunneling microscope described in JP7-49352A, a probe is moved by a function of the scanning tunneling microscope to a position at which atoms should attach, the different material in the probe is melted or softened by the heater to attach to the sample surface. However, what can be continuously attached to a sample by this microscope is only a material filled in advance. Accordingly, this microscope is not suitable for depicting a pattern with pluralities of materials. Although JP7-49352A describes that different materials filled in the probe are selectively melted or softened, the selective melting or softening of one material would be extremely difficult even if pluralities of materials were charged into the probe. Accordingly, to depict a pattern with pluralities of materials, they should practically be charged into the probe one after another, needing an extremely complicated operation.

Objects of the Invention

Accordingly, an object of the present invention is to provide a scanning probe microscope system capable of automatically treating pluralities of samples.

DISCLOSURE OF THE INVENTION

As a result of intense research in view of the above object, the inventors have found that pluralities of samples can be continuously treated by using a hollow probe in a scanning probe microscope, such that a sample is supplied to and/or suctioned from a substrate through the hollow probe whose rear end is connected to a tube, and that a washing liquid, etc. are supplied to and/or suctioned from the tube to wash the hollow probe. The present invention has been completed based on such finding.

Thus, the scanning probe microscope system of the present invention comprises a substrate, a table for supporting the substrate, a hollow probe supported above the table, a tube connected to a rear end of the hollow probe, and a means for washing the hollow probe, a sample passing through the tube and the hollow probe, and the substrate and the washing means being moved by the table such that each of them opposes the hollow probe.

The scanning probe microscope system preferably comprises a substrate mounted onto the support table for regenerating the hollow probe, electric discharge being generated from the hollow probe to the regenerating substrate. It is preferable that the sample is supplied to the substrate via the tube and the hollow probe, and that the sample contained in the substrate is suctioned through the tube and the hollow probe. The substrate or the washing means is preferably conveyed to a position opposing the hollow probe by the rotation of the support table. A multi-way switch valve connected to a rear end of the tube preferably switches the supply of a sample to the substrate and the suction of a sample from the substrate.

A tip end of the hollow probe is preferably ground by at least one method selected from the group consisting of an electrolytic grinding method, an electrolytic cutting method, a chemical grinding method and a mechanical grinding method. The hollow probe is preferably a syringe needle.

DESCRIPTION OF THE PREFERRED EMBODIMENTS

Figure 1:
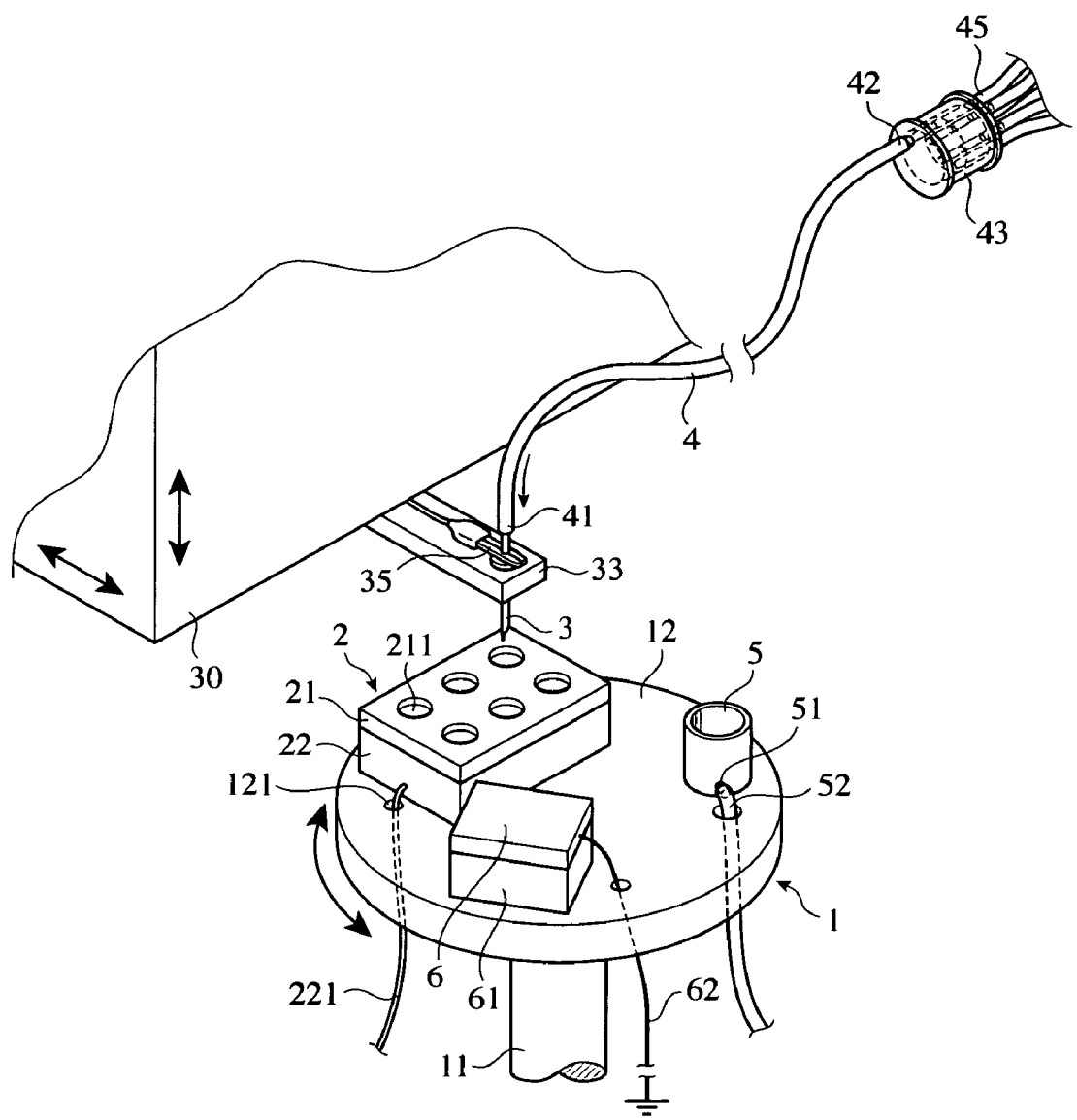
FIG. 1 is a perspective view showing one example of the scanning probe microscope systems of the present invention.

FIG. 1 shows one example of the scanning probe microscope systems of the present invention. The system shown in FIG. 1 comprises a support table 1 having a rotatable shaft 11, a substrate means 2 fixed onto the support table 1, a hollow probe 3 vertically supported above the support table 1, a supply tube 4 communicating with the hollow probe 3, and a washing container 5 and a regenerating or renewing substrate 6 both mounted onto the support table 1.

The support table 1 is constituted by the rotatable shaft 11, and a top plate 12 mounted to a top end of the rotatable shaft 11, such that it is horizontally rotatable. The support table 1 rotates by a predetermined angle according to an order from a driving means (not shown) of the scanning probe microscope system.

The substrate means 2 comprises a planar substrate 21 having pluralities of recesses 211, and a stage 22 supporting the substrate 21. A sample S to be measured is injected into each recess 211. The substrate 21 is preferably electrically conductive, such that it receives electric discharge from the hollow probe 3 while containing the sample S. The substrate 21 is preferably made of carbon, graphite, silicone, mica, molybdenum disulfide, quartz, glass, platinum, gold, silver, copper, nickel, etc. The stage 22 comprises a piezoelectric element (not shown) for the three-dimensional micro-movement of the substrate 21. The movement of the substrate 21 can be controlled on the nanometer order. The stage 22 is fixed to the top plate 12 by screws, etc. A cable 221 of the stage 22 passes through a hole 121 of the top plate 12 and is connected to a system-driving means.

The hollow probe 3 is mounted to a cantilever 33 near its free end. A fixed end of the cantilever 33 is mounted onto a bottom surface of a cantilever-moving means 30. The cantilever 33 is preferably moved by a motor in a biaxial direction, namely along a horizontal axis through a center of the top plate 12 and a vertical axis. The cantilever-moving means 30 can move the hollow probe 3 from one recess 211 to another and make the hollow probe 3 close to a sample S. When the washing container 5 or the regenerating substrate 6 is moved to a position under the cantilever 33 by the rotation of the support table 1, the hollow probe 3 can be lowered to a position close to either of them.

Figure 2:
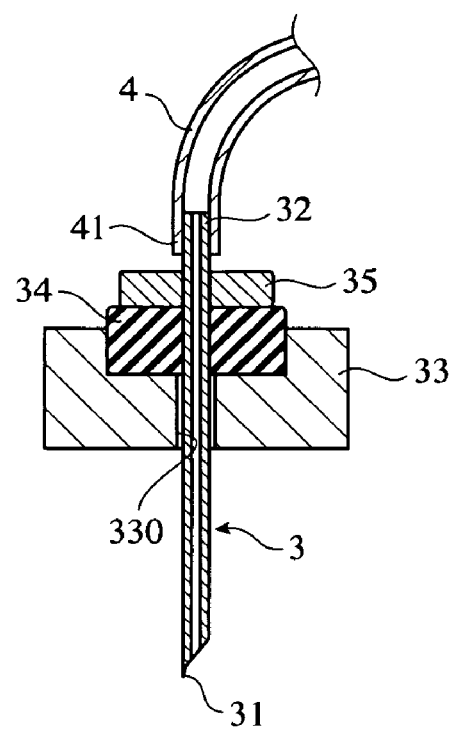
FIG. 2 is a cross-sectional view exemplifying a hollow probe supported by a cantilever.

As shown in FIGS. 1 and 2, the hollow probe 3 is sandwiched by electrodes 35, bringing the electrodes 35 into contact with the side surfaces of the hollow probe 3. Accordingly, electric current can be supplied to the hollow probe 3. As shown in FIG. 2, the cantilever 33 has a probe-receiving hole 330, an about upper half of which has an increased diameter to receive a cylindrical disk member 34. The disk member 34 is preferably made of silicone, etc. The hollow probe 3 penetrates a center portion of the cylindrical disk member 34 and the hole 330.

The hollow probe 3 is preferably ground by at least one method selected from the group consisting of an electrolytic grinding method, an electrolytic cutting method, a chemical grinding method and a mechanical grinding method. The hollow probe 3 ground by at least one of these methods has projections, so that tunneling current can be generated between the hollow probe 3 and the substrate 21 apart therefrom by about 1 nm when voltage is applied. The hollow probe 3 preferably has an inner diameter of about 0.01-0.1 mm and an outer diameter of about 0.1-1 mm, though variable depending on the concentration, viscosity, etc. of the sample S. Preferable as the hollow probe 3 is a commercially available syringe needle, which is electrolytically ground.

A rear end portion 32 of the hollow probe 3 is fit into a tip end portion 41 of the supply tube 4. A rear end 42 of the supply tube 4 is connected to a multi-way switch valve 43, which has an inlet and an outlet on one side, and pluralities of inlets and outlets on the other side. The rotation of the multi-way switch valve 43 on either side can do switching between a state where one inlet or outlet is connected to one of plural inlets or outlets, and a state where one inlet or outlet is not connected to any one of them. As long as switching can be done without contaminating a sample S, the structure of the multi-way switch valve 43 is not particularly restricted. For instance, it may be a three-way switch valve or a manifold. In the case of a manifold, its inside is preferably washable every switching of the sample S. The multi-way switch valve 43 has one side connected to the rear end 42 of the supply tube 4 and the other side connected to plural tubes 45. The multi-way switch valve 43 is switched according to an order from a system-driving means.

The washing container 5 has a waste-liquid-discharging outlet 51, to which a waste tube 52 is attached. When a washing liquid introduced from the hollow probe 3 into the washing container 5 reaches a predetermined height, a valve (not shown) attached to the outlet 51 is opened to discharge the waste liquid.

The regenerating substrate 6 is mounted onto a block 61 fixed to the top plate 12. The regenerating substrate 6 is made of a conductive material. A grounded wire 62 is connected to the regenerating substrate 6. The material of the regenerating substrate 6 may be the same as or different from that of the substrate 21.

Figure 3A:
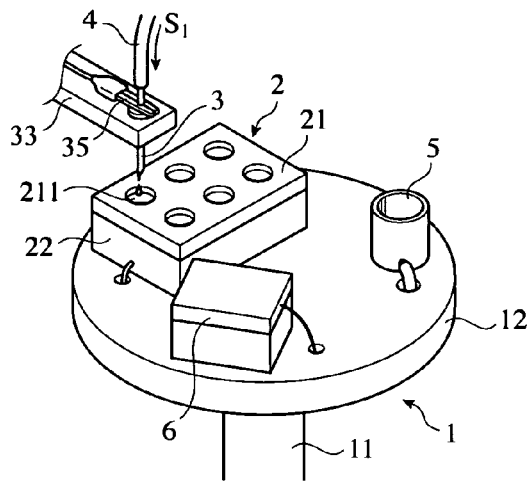
FIG. 3(a) is a perspective view schematically showing the use of the scanning probe microscope system, in which a sample is injected into one of recesses of the substrate.

Using the scanning probe microscope system shown in FIG. 1, it is possible to efficiently observe components separated by liquid chromatography, gas chromatography, ion chromatography and gel permeation chromatography, etc. Taking liquid chromatography for example, microscopic observation using this system will be explained. As shown in FIG. 3(a), the cantilever-moving means 30 is driven to move the cantilever 33, such that the hollow probe 3 opposes one of recesses 211 of the substrate 21. Among liquid fractions separated by the liquid chromatography, a fraction $S_1$ having a peak at the predetermined level or more is injected into the recess 211 through the tube 4 and the hollow probe 3. When pluralities of liquid fractions have peaks at the predetermined level or more, liquid fractions ($S_2, S_3, \ldots$) are introduced into different tubes 45, and retained on the upstream side of the multi-way switch valve 43, namely on the liquid chromatograph side, until the multi-way switch valve 43 is switched according to an order from the system-driving means.

Figure 3D:
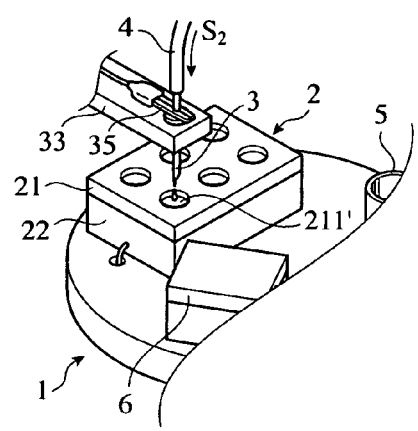
FIG. 3(d) is a partial perspective view schematically showing the use of the scanning probe microscope system, in which a sample is injected into another recess.
Figure 3B:
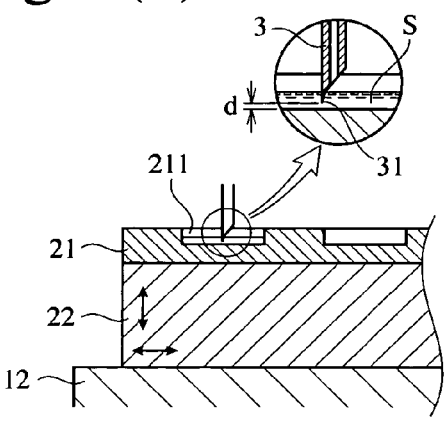
FIG. 3(b) is a partial cross-sectional view schematically showing the use of the scanning probe microscope system, in which a hollow probe is close to a bottom of a recess.
Figure 3E:
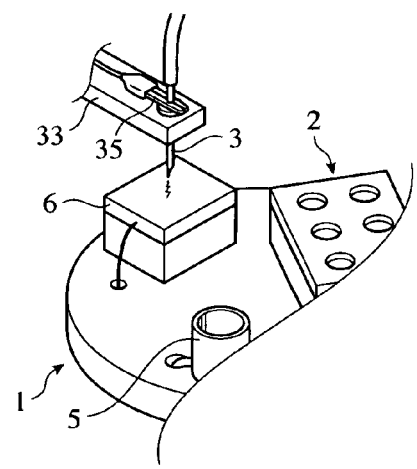
FIG. 3(e) is a partial perspective view schematically showing the use of the scanning probe microscope system, in which electric discharge is generated from the hollow probe to a regenerating substrate.

As shown in FIG. 3(b), the stage 22 moves the substrate 21 to finely adjust the distance between the substrate 21 and the hollow probe 3. With the distance d between a tip end portion of 31 of the hollow probe 3 and a bottom of the recess 211 adjusted to within several nanometers (for instance, 1 nm), bias voltage is applied from the electrode 35 to the hollow probe 3, so that tunneling current flows between the hollow probe 3 and the substrate 21. Bias current is supplied while scanning the substrate 21 in a planar direction by moving the stage 22, and the generated tunneling current is measured to control the height of the substrate 21 such that the current level is always constant. The surface image of the sample S is obtained from the displacement variations with time of the substrate 21.

Figure 3C:
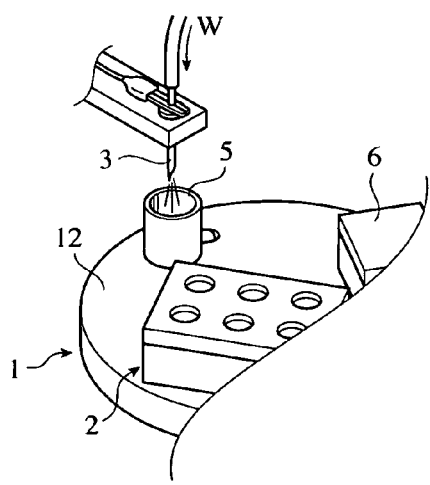
FIG. 3(c) is a partial perspective view schematically showing the use of the scanning probe microscope system, in which a hollow probe is washed.

After the microscopic observation, the hollow probe 3 is elevated by the cantilever-moving means 30, and the support table 1 is rotated such that the hollow probe 3 opposes the washing container 5. After the position adjustment of the hollow probe 3 by the cantilever-moving means 30, a washing liquid W is supplied through the tube 4. The washing liquid W discharged from the hollow probe 3 through the supply tube 4 enters into the washing container 5 [FIG. 3(c)]. After the inner surfaces of the hollow probe 3 and the tube 4 are sufficiently washed with a valve open, the washing liquid W may be stored in the washing container 5 with the valve closed, so that the hollow probe 3 moved by the cantilever-moving means 30 is immersed in the washing liquid W. The immersion of the hollow probe 3 in the washing liquid W can wash the outer surface of the hollow probe 3. With the hollow probe 3 and the supply tube 4 sufficiently washed, another sample is put in a state of supply and microscopic observation.

To carry out the microscopic observation of the next sample $S_2$, as shown in FIG. 3(d), the support table 1 is rotated, and the cantilever 33 is moved, such that the hollow probe 3 opposes an unused recess 211'. Because a liquid fraction $S_2$ separated by chromatography exists on the upstream side of the multi-way switch valve 43, the multi-way switch valve 43 is switched to connect a tube 45 containing the liquid fraction $S_2$ to the supply tube 4. The switching of the multi-way switch valve 43 causes the liquid fraction $S_2$ remaining in the tube 45 to enter into the unused recess 211' through the supply tube 4. The microscopic observation of the liquid fraction $S_2$ can be conducted in the same manner as described above.

Because the repetition of microscopic observation wears the hollow probe 3, it should be regenerated or renewed by grinding. To grind the hollow probe 3, as shown in FIG. (e), the support table 1 is rotated until the hollow probe 3 opposes the regenerating substrate 6, and electric discharge is generated from the hollow probe 3 to the regenerating substrate 6. Electric discharge roughens a tip end portion of the hollow probe 3, such that projections are formed again. Tunneling current can be generated from the projections. With the distance between the tip end portion 31 of the hollow probe 3 and the regenerating substrate 6 adjusted to 0.1-5 nm, voltage of −10 V to +10 V is preferably applied. Programming is preferably made in advance to conduct grinding every 10-100 microscopic observations.

Figure 4:
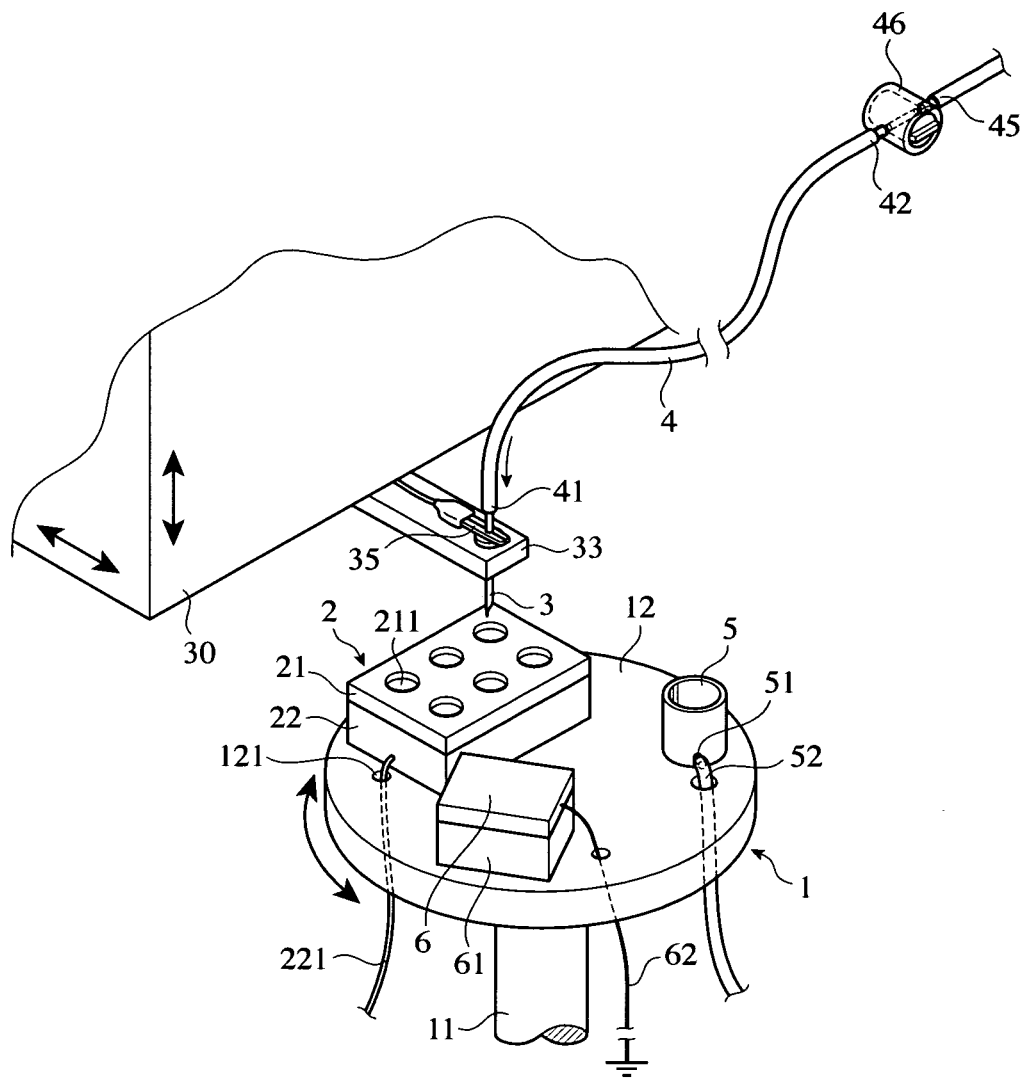
FIG. 4 is a perspective view showing another example of the scanning probe microscope systems of the present invention.
Figure 5:
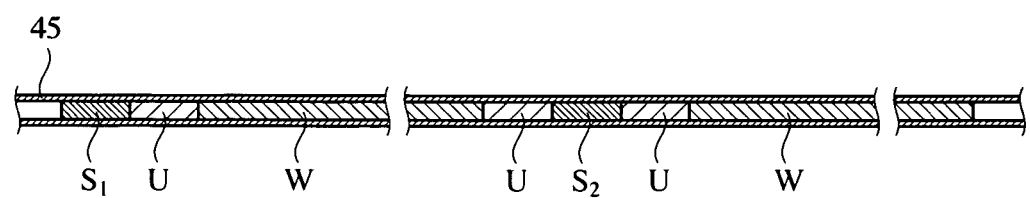
FIG. 5 is a cross-sectional view showing a tube filled with a sample, an incompatible liquid and a washing liquid.

Because the scanning probe microscope system shown in FIG. 4 is substantially the same as shown in FIG. 1 except that a two-way switch valve 46 is connected to a rear end of a supply tube 4, only differences will be explained below. As shown in FIG. 5, the tube 45 contains a first sample $S_1$, an incompatible liquid U, a washing liquid W, an incompatible liquid U, a second sample $S_2$, an incompatible liquid U, and a washing liquid W in this order from the hollow probe 3. The incompatible liquid U is substantially immiscible with the first and second samples $S_1, S_2$. Because the washing liquid W has large solubility to each sample $S_1, S_2$, the washing liquid W passing through the tube 4 washes away each sample $S_1, S_2$ attached to its inner surface.

After the microscopic observation of the first sample $S_1$ in the recess 211, the two-way switch valve 46 is closed. The hollow probe 3 is elevated by the cantilever-moving means 30, and the support table 1 is rotated until the hollow probe 3 opposes the washing container 5. When the two-way switch valve 46 is opened, the incompatible liquid U, the washing liquid W and the incompatible liquid U flow from the supply tube 4 into the washing container 5 in this order. The washing liquid W washes the inner surfaces of the supply tube 4 and the hollow probe 3.

Immediately after the second sample $S_2$ starts to flow out, the two-way switch valve 46 is closed, the position of the hollow probe 3 is adjusted by the cantilever-moving means 30 with the support table 1 rotated, such that the hollow probe 3 opposes an unused recess 211'. In this state, the two-way switch valve 46 is opened to supply the second sample $S_2$. Thus, the samples $S_1, S_2$, the incompatible liquid U and the washing liquid W contained in the supply tube 4 in the above-described order make it possible to supply the samples $S_1, S_2$ to the recesses 211, 211', respectively, for microscopic observation without contamination.

Another example of using the scanning probe microscope system shown in FIGS. 1 and 4 will be explained below. After the first reagent $S_1$ is supplied to the recess 211 and microscopically observed, the hollow probe 3 is washed. The second reagent $S_2$ reactive to the first reagent $S_1$ is supplied to the same recess 211 as the reagent $S_1$, to conduct microscopic observation by the hollow probe 3. When the reagent $S_2$ is supplied with the hollow probe 3 close to the substrate 21, the reaction of the reagent $S_2$ with the reagent $S_1$ can be observed immediately after the supply of the reagent $S_2$.

Figure 6:
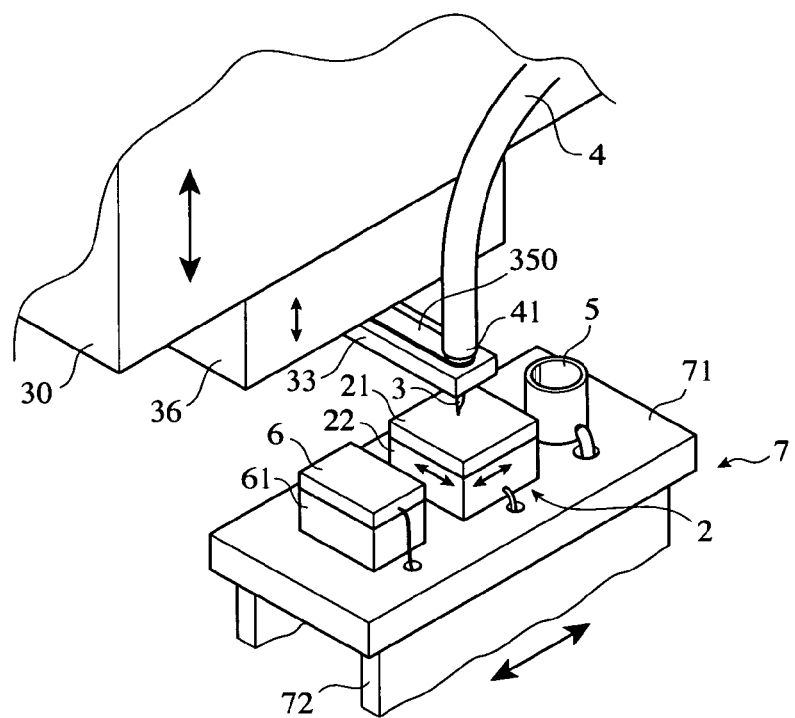
FIG. 6 is a perspective view showing a further example of the scanning probe microscope systems of the present invention.

FIG. 6 shows a further example of the scanning probe microscope systems of the present invention. The scanning probe microscope system shown in FIG. 6 comprises a slidable stage 7 having a rectangular top plate 71, and a washing container 5, a substrate means 2 and a regenerating substrate 6 mounted onto the slidable stage 7. The washing container 5, the substrate means 2 and the regenerating substrate 6 are arranged on the top plate 71 longitudinally in this order.

The slidable stage 7 comprising a top plate 71, and a pair of legs 72, 72 supporting the top plate 71. Each leg 72, 72 has a planar shape, and a lower edge of the leg 72, 72 engages a rail (not shown). The slidable stage 7 moves horizontally in a longitudinal direction according to an order from the driving means.

The substrate means 2 is fixed to the top plate 71. A stage 22 of the substrate means 2 finely moves the substrate 21 in a horizontal plane (X-Y plane). The micro-movement of the stage 22 changes a relative position of the substrate 21 to the hollow probe 3. The movement of the stage 22 is programmed such that the hollow probe 3 has a desired locus relative to the substrate 21.

The hollow probe 3 is vertically mounted to a free end of the cantilever 33, which is mounted onto a bottom surface of a vertically micro-moving means 36. The vertically micro-moving means 36 contains a piezoelectric element for finely moving the cantilever 33 in a vertical direction (z-axis direction) according to an order from the system-driving means. The micro-movement of the cantilever 33 leads to the micro-movement of the hollow probe 3 attached to the cantilever 33 by the same distance.

The vertically micro-moving means 36 is mounted to a cantilever-moving means 30, which is driven by a motor. The vertically micro-moving means 36 and the cantilever 33 attached thereto move in a vertical direction by a relatively large distance by the cantilever-moving means 30. Namely, the vertically micro-moving means 36 finely moves the hollow probe 3 attached to the cantilever 33 on the nanometer order in a vertical direction, and the cantilever-moving means 30 moves the hollow probe 3 on the order of millimeter or centimeter in a vertical direction.

Figure 7:
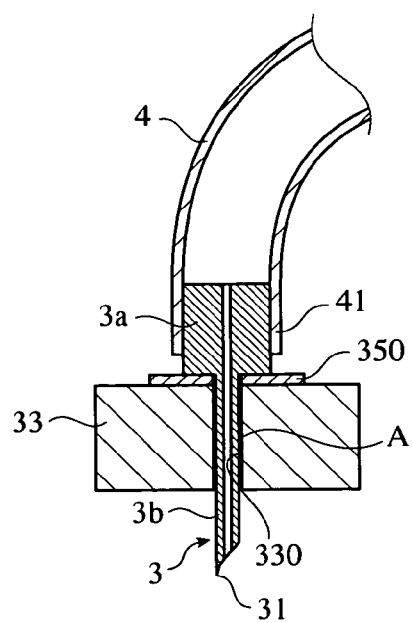
FIG. 7 is a cross-sectional view showing another example of a hollow probe supported by a cantilever.

As shown in FIG. 7, the hollow probe 3 comprises a large-diameter portion 3a, and a small-diameter portion 3b extending downward from the large-diameter portion 3a. The small-diameter portion 3b is fixed to a probe-receiving hole 330 of the cantilever 33 by an adhesive A. The cantilever 33 is provided with an electrode plate 350 on its upper surface, and a hole of the electrode plate 350 is aligned with the probe-receiving hole 330. A lower end of the large-diameter portion 3a is in contact with an upper surface of the electrode plate 350, so that electric current can be supplied to the hollow probe 3.

The supply tube 4 has a tip end portion 41, into which the large-diameter portion 3a of the hollow probe 3 is fitted, and a rear end 42 connected to one side of the multi-way switch valve 43. The other side of the multi-way switch valve 43 is connected to pluralities of tubes 45, in each of which a material $M_1$, $M_2$ . . . for producing a pattern is filled. One of plural tubes 45 is connected to the supply tube 4 by switching the multi-way switch valve 43.

In a state where the hollow probe 3 is above the substrate 21, the cantilever-moving means 30 is driven to move the hollow probe 3 to the substrate 21. After the substrate 21 is moved to a position facing the hollow probe 3 by the stage 22 and the vertically micro-moving means 36, the multi-way switch valve 43 is opened, and the hollow probe 3 scans the substrate 21 while permitting the first material $M_1$ to flow from the hollow probe 3. By scanning, a pattern of the first material $M_1$ is depicted on the substrate 21.

Before switching the material to be supplied to the hollow probe 3 from $M_1$ to $M_2$, the hollow probe 3 is washed. Specifically, the slidable stage 7 is moved such that the washing container 5 comes immediately under the hollow probe 3, and the hollow probe 3 is washed by using the washing container 5 and the washing liquid. The slidable stage 7 is then moved in an opposite direction such that the substrate 21 comes immediately under the hollow probe 3, so that a pattern can be depicted without mixing the materials $M_1$ and $M_2$.

When the hollow probe 3 is worn, the slidable stage 7 is moved such that the regenerating substrate 6 comes immediately under the hollow probe 3, and electric discharge is generated from the hollow probe 3 to the regenerating substrate 6 to regenerate or renew the hollow probe 3. Using this system, a nanometer-scale pattern of plural materials $M_1$, $M_2$ . . . can be depicted.

Figure 8:
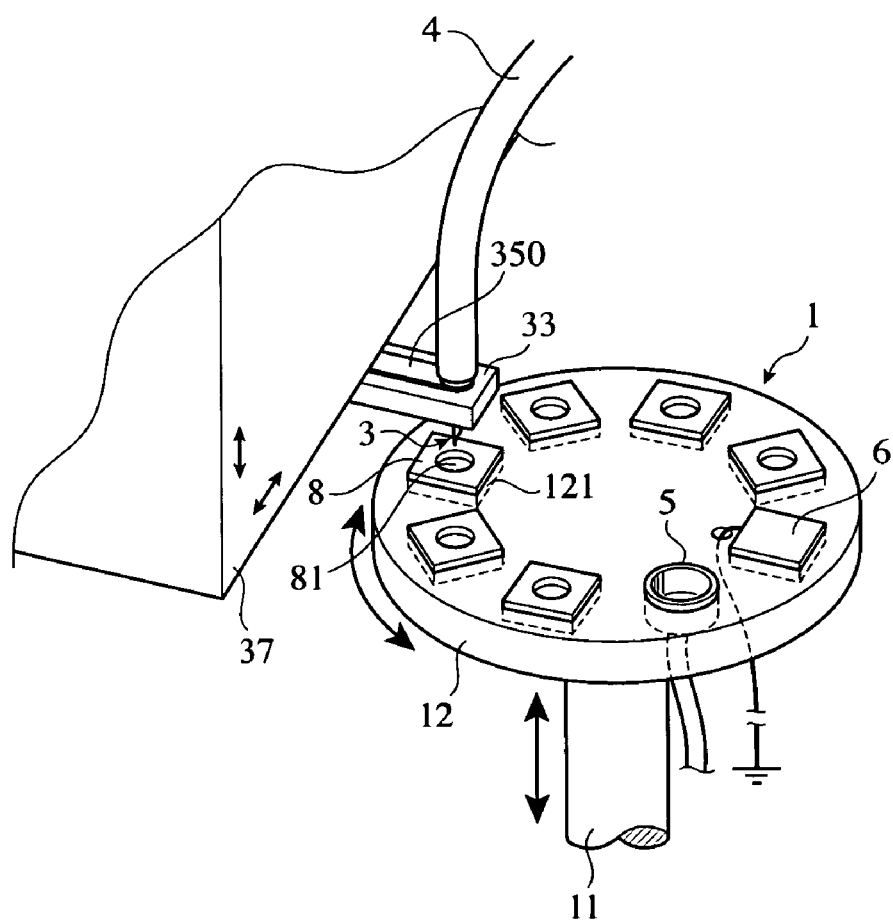
FIG. 8 is a perspective view showing a still further example of the scanning probe microscope systems of the present invention.

FIG. 8 shows a still further example of the scanning probe microscope systems of the present invention. Because the example shown in FIG. 8 is substantially the same as shown in FIG. 1, except that pluralities of small substrates 8, a washing container 5 and a regenerating substrate 6 are circularly fixed onto a support table 1, only differences will be explained below. Each small substrate 8 has a recess 81. The small substrates 8, the washing container 5 and the regenerating substrate 6 are received in recesses 121 on the top plate 12, such that they do not slide when the support table 1 is rotated.

The support table 1 is rotated by a motor and moves vertically on the millimeter or centimeter order by the vertical movement of the rotatable shaft 11. A cantilever 33 fixed to a bottom surface of a three-dimensionally micro-moving device 37 and a hollow probe 3 attached thereto move three-dimensionally on the nanometer order.

After one of the small substrates 8 is brought to a position opposing the hollow probe 3 by the rotation and vertical movement of the rotatable shaft 11, they are made closer by the three-dimensionally micro-moving device 37 until the distance between the hollow probe 3 and a bottom of the recess 81 becomes several nanometers. A sample S is supplied from the hollow probe 3 to the recess 81, and electric current is supplied from an electrode plate 350 to the hollow probe 3. While measuring the generated tunneling current, the hollow probe 3 conducts scanning by the three-dimensionally micro-moving device 37. To conduct the switching of the sample S, and the washing and regeneration of the hollow probe 3, the rotatable shaft 11 is rotated such that the hollow probe 3 opposes the washing container 5 or the regenerating substrate 6. In the scanning probe microscope system shown in FIG. 8, the hollow probe 3 is moved on the nanometer order during microscopic observation, and the support table 1 is moved on the order of millimeter or more when the sample S is switched or when the hollow probe 3 is washed or regenerated.

Figure 9:
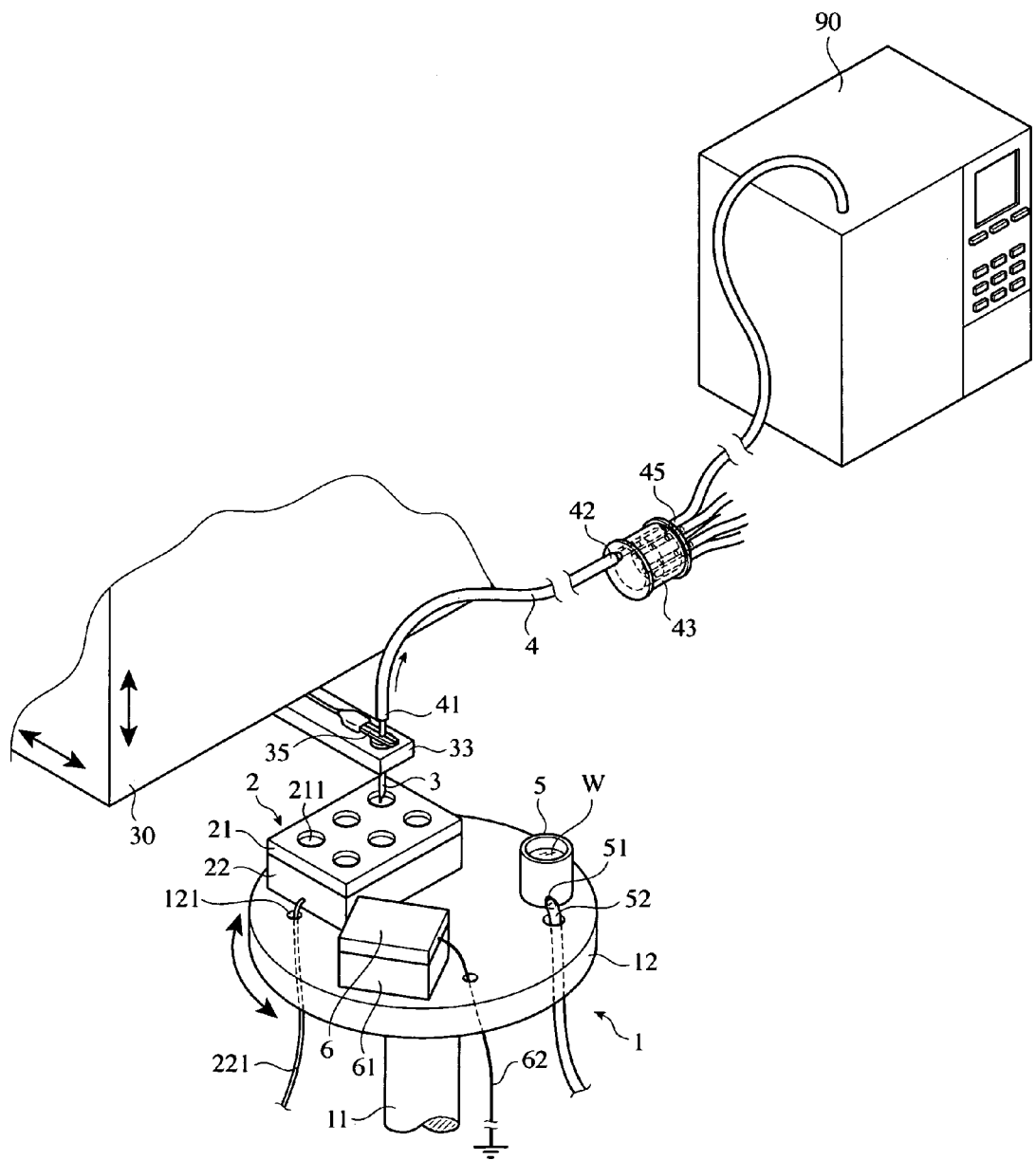
FIG. 9 is a perspective view showing an example of the scanning probe microscope system connected to an analyzer.

FIG. 9 exemplifies a scanning probe microscope system connected to an analyzer 90. Because the scanning probe microscope system shown in FIG. 9 is substantially the same as shown in FIG. 1, except that the analyzer 90 is connected to the multi-way switch valve 43 on the side of plural inlets and outlets, only differences will be explained below. A tube 45 connected to the analyzer 90 is used to suction the sample S contained in the recess 211 into the analyzer 90. The other tubes supply samples S. Specific examples of the analyzer 90 include a mass analyzer, a chromatograph, an infrared spectrometer and a visible-ultraviolet spectrometer.

The sample S is supplied from the hollow probe 3 to one of the recesses 211 by operating the multi-way switch valve 43, and a surface of the sample S introduced into one of the recesses 211 is scanned by finely moving the substrate 21 by the stage 22. The hollow probe 3 is stopped on the sample S at a position at which examination should be conducted, and the analyzer 90 is operated by switching the multi-way switch valve 43. When the analyzer 90 is evacuated in a state where the hollow probe 3 is connected to the analyzer 90, a part $p_1$ of the sample S is suctioned into the analyzer 90 through the tube 4. What is suctioned into the analyzer 90 is a portion $p_1$ of the sample S, which is close to the hollow probe 3. Using this system, a surface of the sample S can be observed, and the composition of the desired portion, etc. can be easily measured. After analyzing a part $p_1$ of the sample S, a washing liquid W introduced into the washing container 5 is suctioned to wash the hollow probe 3 and the tube 4.

Taking the scanning tunneling microscope system for example, the system of the present invention has been explained above, though the present invention is not restricted thereto. The microscope used in the system of the present invention may be a scanning microscope in which a probe is moved relative to a sample. Thus, in addition to the scanning tunneling microscope system, scanning probe microscope systems using scanning atomic force microscopes, scanning near-field microscopes, scanning electrochemical microscopes, etc. are within the scope of the present invention.

The present invention will be explained in more detail referring to Examples below without intention of restricting the present invention thereto.

EXAMPLE 1

A tip end portion (length: 1 mm) of a stainless steel tube (outer diameter: 0.3 mm, inner diameter: 0.1 mm, and length: 20 mm) was immersed in 200 mL of hydrochloric acid at a concentration of 1 M, and electropolished by applying 15-V AC voltage to form a hollow probe. This hollow probe was mounted to a scanning tunneling microscope (JSPM-4200 available from JEOL Ltd.) to assemble a scanning probe microscope system shown in FIG. 1. Used as a substrate 21 was a high-orientation graphite plate having recesses each having an inner diameter of 3 mm and a depth of 0.5 mm. Tetrahydrofuran was charged into a washing container 5.

Figure 10:
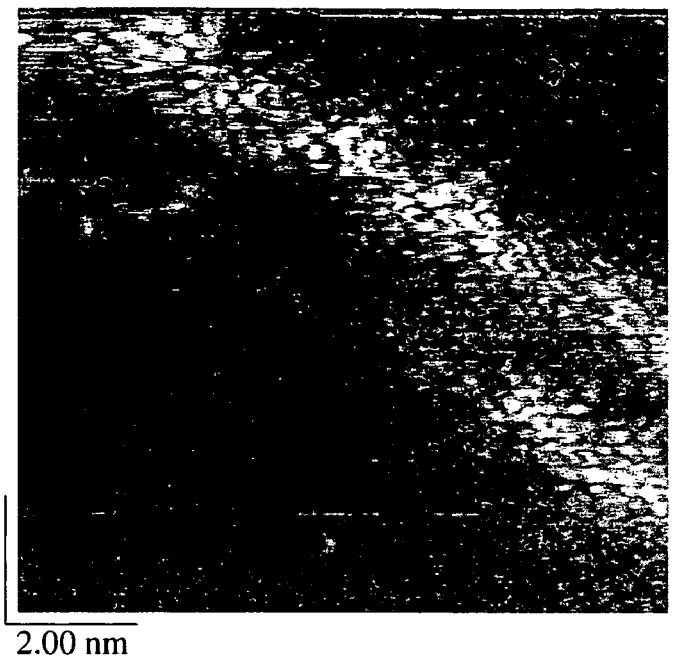
FIG. 10 is a photograph of a graphite plate taken by a tunneling microscope.

The hollow probe 3 scanned the opposing recess 211 of the substrate 21 while applying voltage from an electrode 35, to observe the atom image of graphite. FIG. 10 shows a photograph of the graphite plate taken by a tunneling microscope. The observed atom image was not different from the image taken by a scanning tunneling microscope comprising a general probe made of platinum, tungsten, etc., which was not hollow.

Figure 11:
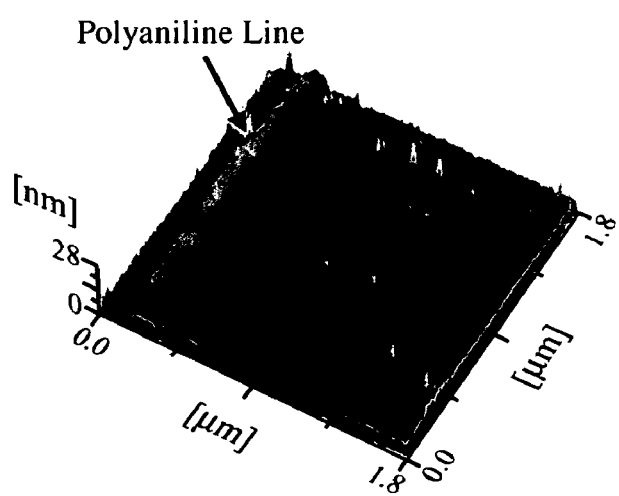
FIG. 11 is a photograph of a polyaniline line taken by a tunneling microscope.

After scanning by the hollow probe 3 while supplying a solution of polyaniline (emeraldine base available from Sigma Aldrich) in tetrahydrofuran at a concentration of 0.01 mg/mL from the hollow probe 3 to the recess 211, the supply of the polyaniline solution was stopped to conduct observation by a tunneling microscope. FIG. 11 shows a photograph of the polyaniline solution taken by a tunneling microscope. Polyaniline was adsorbed and/or accumulated onto the graphite plate, forming a conductive polymer line having a width of about 50 nm and a height of about 10 nm. After microscopic observation, the hollow probe 3 was immersed in tetrahydrofuran in the washing container 5, and then taken out.

EXAMPLE 2

Figure 12:
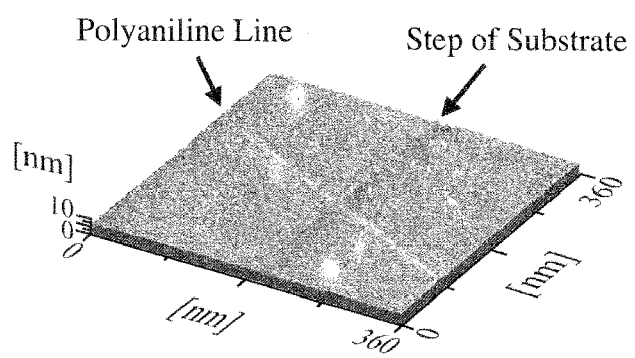
FIG. 12 is another photograph of a polyaniline line taken by a tunneling microscope.

The hollow probe 3 used and washed in Example 1 scanned the recess 211 in the same manner as in Example 1 except that a polyaniline solution at a concentration of 0.001 mg/mL was supplied to the hollow probe 3. After scanning, observation was conducted by a tunneling microscope. FIG. 12 shows a photograph of the polyaniline solution taken by a tunneling microscope. Even when a polyaniline solution having as low a concentration as 0.001 mg/mL was used, polyaniline was adsorbed and/or accumulated onto the graphite plate, forming a conductive polymer line having a width of about 20 nm and a height of about 5 nm.

Because the hollow probe 3 deteriorated, the support table 1 was rotated such that the hollow probe 3 opposed the regenerating substrate 6, and voltage of 3-10 V was applied to the hollow probe 3 for 10 seconds, with the distance between a tip end of the hollow probe 3 and the regenerating substrate 6 set to about 1 nm. With the hollow probe 3 made opposite to the conductive polymer line, observation was conducted by a tunneling microscope again. As a result, a clear image of molecule arrangement was taken like before the deterioration.

EFFECT OF THE INVENTION

The scanning probe microscope system of the present invention can automatically analyze plural kinds of samples, and depict the desired patterns with plural kinds of materials. Because the hollow probe can be washed while being mounted to the cantilever, its continuous use does not contaminate samples. In the preferred scanning probe microscope system, the regeneration of the hollow probe can be conducted while being mounted to the cantilever, so that observation is not interrupted by the deterioration of the hollow probe.

The scanning probe microscope system capable of automatically treating plural kinds of samples is suitable for observing pluralities of components separated by chromatography, etc., and determining the stereospecific structure and/or configuration of each component. Because observation can be done immediately after supplying a sample, the reaction of plural chemicals can be tracked. The scanning probe microscope system of the present invention capable of easily conducting these analyses is highly useful in the fields of chemicals and pharmaceuticals. Further, it can be used as a nano-working pen by causing the hollow probe to scan as programmed while continuously supplying a material for working a substrate.

What is claimed is:

1. A scanning probe microscope system comprising:
   a substrate,
   a table for supporting said substrate,
   a hollow probe comprising a single channel supported above said table,
   a tube connected to a rear end of said hollow probe, and
   means for washing said hollow probe,
   wherein a sample passes through said tube and said single channel of said hollow probe,
   wherein said substrate and said washing means are moved by said table such that each of them is positioned under a lower end of said hollow probe, and
   wherein a multi-way switch valve connected to a rear end of said tube is configured to switch a supply of said sample to said substrate to a suction of said sample from said substrate through said single channel of said hollow probe.

2. The scanning probe microscope system according to claim 1, wherein it further comprises a regenerating substrate mounted onto said support table for regenerating said hollow probe, electric discharge being generated from said hollow probe to said regenerating substrate.

3. The scanning probe microscope system according to claim 1, wherein said sample is supplied to said substrate via said tube and said hollow probe.

4. The scanning probe microscope system according to claim 1, wherein a sample contained in said substrate is suctioned through said tube and said hollow probe.

5. The scanning probe microscope system according to claim 1, wherein a tip end portion of said hollow probe is ground by at least one method selected from the group consisting of an electrolytic grinding method, an electrolytic cutting method, a chemical grinding method and a mechanical grinding method.

6. The scanning probe microscope system according to claim 1, wherein said hollow probe is a syringe needle.

* * * * *